United States Patent [19]

Lynum et al.

[11] Patent Number: 6,068,827
[45] Date of Patent: *May 30, 2000

[54] DECOMPOSITION OF HYDROCARBON TO CARBON BLACK

[75] Inventors: Steinar Lynum, Oslo; Nils Myklebust; Ketil Hox, both of Trondheim, all of Norway

[73] Assignee: Kvaerner Engineering AS, Lysaker, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,850

[22] Filed: Jan. 10, 1997

Related U.S. Application Data

[63] Continuation of application No. 08/307,834, filed as application No. PCT/NO93/00056, Apr. 5, 1993, abandoned.

[30] Foreign Application Priority Data

Apr. 7, 1992 [NO] Norway ..................................... 921360

[51] Int. Cl.$^7$ ...................................................... C09C 1/48
[52] U.S. Cl. ............................................................. 423/458
[58] Field of Search ....................... 219/121.54; 423/450, 423/458; 427/249

[56] References Cited

U.S. PATENT DOCUMENTS

| | | | |
|---|---|---|---|
| 4,174,462 | 11/1979 | Pearce | 219/634 |
| 4,751,069 | 6/1988 | Ducote et al. | 423/458 |
| 5,090,340 | 2/1992 | Burgess | 219/121.51 |

*Primary Examiner*—Steven P. Griffin
*Assistant Examiner*—Stuart L. Hendrickson
*Attorney, Agent, or Firm*—Jeffrey S. Melcher; Farkas & Manelli, PLLC

[57] ABSTRACT

A decomposition reactor for installation in connection with a thermal decomposition chamber for hydrocarbon gases, especially a plasma torch, is designed in the form of a defined, insulated chamber, with an inlet for admixtures/gases in the walls of the reactor space. In order to improve the control of the products produced, the supply channels in the walls of the reactor are provided with channels for introducing hydrocarbon gases of the same kind as the main medium introduced at a temperature of between 1,000 and 2,000° C. in the upper region of the space. Hydrocarbon gas of a lower temperature is introduced at one or more points further down in the reactor. A method for the operation of such a decomposition reactor for the production of carbon black with defined physical properties, is also described.

3 Claims, 1 Drawing Sheet

6,068,827

DECOMPOSITION OF HYDROCARBON TO CARBON BLACK

This is a continuation of application Ser. No. 08/307,834, filed on Dec. 22, 1994, which was abandoned upon the filing hereof and which is a 371 of PCT/NO93/00056 filed Apr. 5, 1993.

FIELD OF THE INVENTION

The invention relates to a decomposition reactor for installation in connection with a thermal decomposition chamber for hydrocarbon gases, especially a plasma torch, wherein the reactor is designed as a defined, insulated chamber with an inlet for admixtures/gases through the walls of the reactor chamber. In connection with the decomposition of hydrocarbons in plasma torches, a method is known for providing reactor chambers for further processing of the reaction products or decomposition products. Such reactors are known, e.g., for the production of acetylene. Reactor chambers have also been used in connection with the production of carbon black and hydrogen where special temperatures have been set in the reactor in order to obtain a special characteristic for the end product.

BACKGROUND OF THE INVENTION

A method is also known for introducing special gases along the reactor walls in order to prevent the formation of deposits and in order to cool the wall areas.

However, in none of these known reactors has a sufficiently even quality been achieved in the produced carbon black with regard to its structure. This is probably due to the formation of various arbitrary temperature zones in the reactor, which result in an uncontrolled carbon development and thereby a relatively unspecified quality in the final product. By introducing gas along the reactor wall in order to prevent the formation of deposits, similar side effects have occurred as well as the establishment of temperature zones which have had a detrimental effect on the products. Without such gases problems have very frequently arisen with deposits on the reactor walls which have resulted in stoppages for scraping, in order to make the reactor operational again. These problems have led to reactors generally having been operated intermittently with the consequent increase in operational costs.

SUMMARY OF THE INVENTION

The object of the present invention is to provide a reactor which makes it possible to have greater control over the products obtained. A further object of the invention is to provide a reactor which can be kept in continuous operation and where strict control is obtained over the temperature development throughout the entire reactor, where it is possible to control any admixtures and thereby obtain a product with a desired quality and physical properties.

These objects are achieved with a decomposition reactor of the type described in the introduction, which is characterized by the features in the patent claims presented.

With the reactor according to the invention one makes use of the possibility of controlling both the supply of additional starting materials in the actual reactor chamber and of controlling the temperature conditions. The possibility is also offered of supplying desired admixtures to the final products from the reactor. It has surprisingly been discovered that by the admixture of additional starting materials, i.e. hydrocarbon gas in the reactor chamber, control can be obtained of the structure of the produced carbon black. The hydrocarbon which is decomposed in the reactor is preferably a natural gas or methane, which constitutes a very pure hydrocarbon mixture, so that completely pure carbon and hydrogen are principally obtained in the reactor. The carbon black which is formed in the torch flows into the reactor chamber and is distributed therein. According to the invention additional natural gas or methane is supplied which can be preheated to a desired temperature, e.g. through an inlet in the reactor wall or heat exchanged with the product stream flowing out of the reactor space. This methane is decomposed in the reactor in a similar manner to the methane which comes from the torch, but since a temperature difference exists here, these already formed carbon particles will act as nuclei on which the decomposed carbon supplied through the reactor side wall will be deposited and grow into larger soot particles or carbon particles. This deposit or growth of carbon particles can be controlled by controlling the quantity of hydrocarbons supplied in the reactor chamber, by controlling the feed temperature for the additional carbon material and by admixture in several zones with different temperatures, thus causing the development of a structure on the nuclei of carbon from the plasma torch. This deliberate control of the temperature conditions, the admixture and admixture point offers the possibility of adjusting the exact structure conditions desired for the carbon black produced.

The control mechanism in the reactor chamber can also be of such a nature that it may be desirable not to supply additional hydrocarbon gas in the reactor chamber, but only to influence the temperature in such a manner that the produced carbon black retains its structure, by letting it cool at a desired rate on its way through the reaction chamber so that it is not influenced uncontrollably or detrimentally by the temperature change.

In the reactor chamber there may similarly be introduced admixtures which will also be deposited on the carbon black and provide desired effects with regard to the areas of application of the carbon black.

BRIEF DESCRIPTION OF THE DRAWING

The invention will now be described in more detail by means of an embodiment which is illustrated purely schematically in the drawing, which illustrates the principles of the design of the reactor according to the invention.

DETAILED DESCRIPTION OF THE INVENTION

Figure 1:
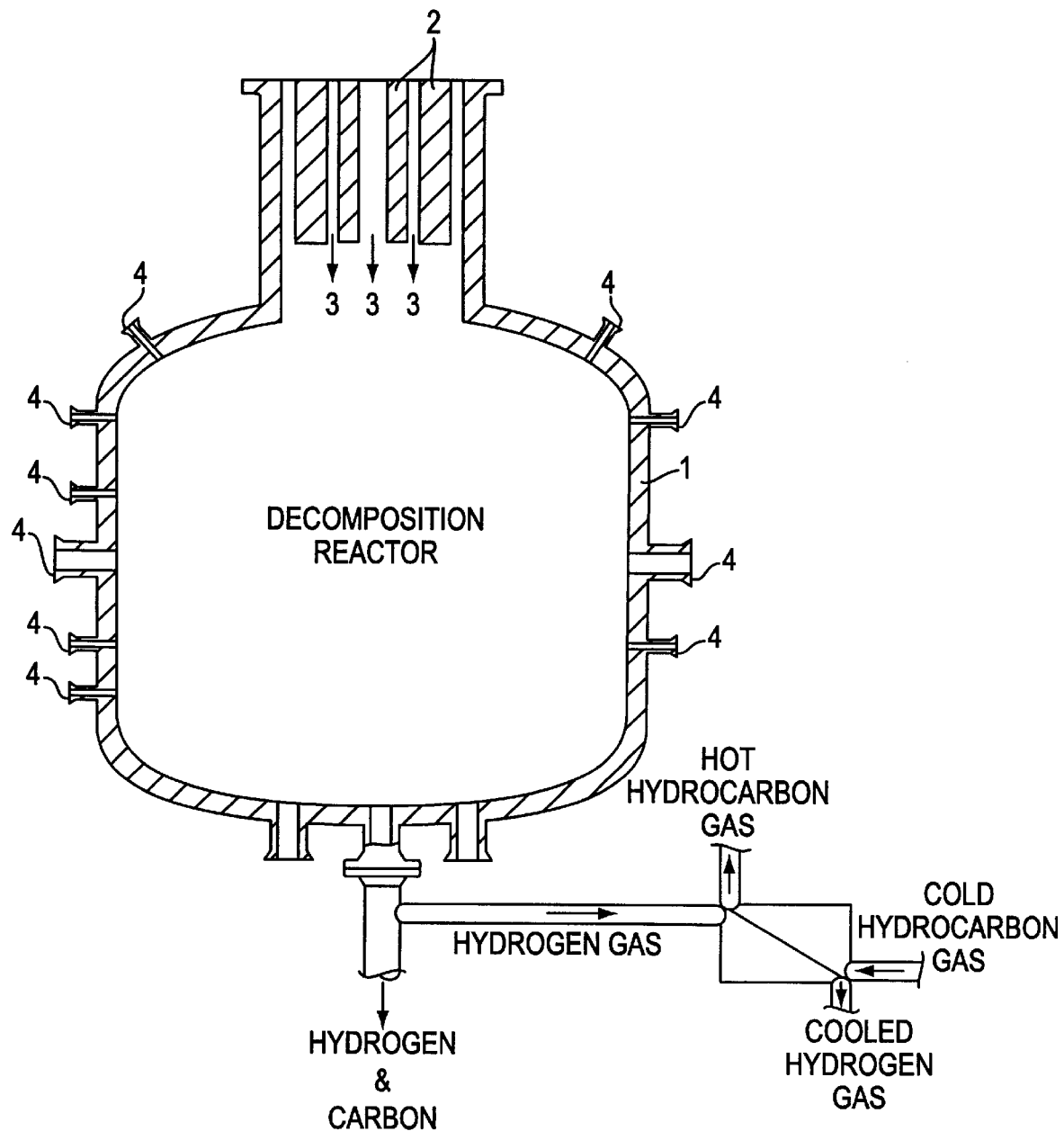

In the drawing the basic concept of a reactor chamber is illustrated, which should enable a person skilled in the art to develop the technical solutions with the aid of well known means. As illustrated here the nature of the reactor chamber is of the same principle as that described in the applicant's Norwegian patent application 91 4904. The actual decomposition reactor is generally indicated by 1. Plasma torches are indicated by 2 and the decomposition products entering the reactor, carbon black and hydrogen are generally indicated by 3, indicated here by arrows. The decomposition products will distribute themselves in the reactor and the carbon component will be influenced and developed by the prevailing temperature conditions.

In the side walls of the reactor there are provided lead-in pipes for additional hydrocarbon gases of the same kind as the main medium introduced. These gases are preheated and may have a temperature between 1000 and 2000° C. in the upper region of the space while cooler gases can be introduced further down in the reactor. Additional hydrocarbon may be introduced at lower than 1000° C. further down the reactor. The lead-in pipes are indicated by 4. Through these lead-in pipes or nozzles admixtures can also be supplied or only heating gases such as hydrogen can be supplied here in order to maintain special temperature conditions in the reactor. The hot hydrocarbon gases which flow into the reactor from the side will also be decomposed and the produced carbon black will be deposited on the carbon black from the plasma torch forming nuclei, these again growing into particles. When setting the temperature for the introduction of the additional gases, the particle growth can therefore be controlled and thereby the physical properties of the produced carbon black can also be controlled. This can be done in the various zones along the reactor or by special settings of the temperature. Admixtures which are introduced through such lead-in pipes will also be deposited on the carbon black, thus providing the desired side effects. If special qualities are desired based on special temperature conditions, the supply of hydrocarbons through the lead-in pipes may also be omitted, and provision made only for the maintenance of specific temperature zones for the decomposition products from the plasma torch.

Thus it should be clear that by means of the reactor according to the invention it is possible to achieve special structures and physical properties of the produced carbon black, thus making it possible to obtain a special product which is adapted to suit subsequent applications.

The above description covers only the principles of the construction of such a reactor and a method for the production of special qualities of carbon black. It should be obvious from the above that many modifications will be possible within the scope of the invention.

We claim:

1. A method for the production of carbon using a decomposition reactor which is connected to a plasma torch where hydrocarbons are decomposed to carbon and hydrogen and said decomposition reactor is provided with a plurality of supply channels through the reactor walls and which has an upper region and a lower region comprising the steps of, in addition to the decomposition products from the plasma torch, supplying a first hydrocarbon gas through the supply channels through the reactor walls at a temperature of between 1,000 and 2,000° C. in an upper region of the reactor, introducing additional hydrocarbon gas at a temperature lower than 1,000° C. at at least one point downstream of where said first hydrocarbon gas is introduced and adjusting the introduction of the additional hydrocarbon gas to obtain a temperature distribution in the reactor and with said first hydrocarbon gas decomposing into carbon and hydrogen so that the carbon part of the hydrocarbon gas from the supply channels is deposited on the carbon from the plasma torch.

2. A method according to claim 1, characterized in that only heating gases are introduced through the supply channels (4).

3. The method as claimed in claim 1, wherein hydrocarbon gases are fed to said plasma torch and the same hydrocarbon gases are supplied through said supply channels to said reactor.

* * * * *